(12) United States Patent
Nagai et al.

(10) Patent No.: US 8,451,557 B2
(45) Date of Patent: May 28, 2013

(54) DISK DRIVE DEVICE HAVING A VIBRATION-REDUCING ELEMENT

(75) Inventors: Kazuyoshi Nagai, Shizuoka (JP); Hiroshi Iwai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 304 days.

(21) Appl. No.: 12/871,508

(22) Filed: Aug. 30, 2010

(65) Prior Publication Data

US 2011/0096437 A1    Apr. 28, 2011

(30) Foreign Application Priority Data

Oct. 22, 2009    (JP) .................................. 2009-243252

(51) Int. Cl.
*G11B 5/82* (2006.01)
(52) U.S. Cl.
USPC .................................... 360/99.08; 360/97.19
(58) Field of Classification Search
USPC .......... 360/98.07, 99.08–99.11, 99.04, 97.19; 310/67 R
See application file for complete search history.

(56) References Cited

U.S. PATENT DOCUMENTS

| | | | | |
|---|---|---|---|---|
| 5,798,887 A | * | 8/1998 | Yoshida et al. | 360/99.08 |
| 5,815,345 A | * | 9/1998 | Pelstring et al. | 360/99.08 |
| 6,809,898 B1 | * | 10/2004 | Prochazka | 360/99.08 |

FOREIGN PATENT DOCUMENTS

JP    2007213629 A1    8/2007

* cited by examiner

*Primary Examiner* — Brian Miller
(74) *Attorney, Agent, or Firm* — Fulwider Patton LLP

(57) ABSTRACT

In a disk drive device, a magnetic recording disk is to be mounted on a hub. A base plate rotatably supports the hub through a bearing unit. A projecting portion is formed on the upper surface of the base plate having a cylindrical side surface centered along the rotational axis of the motor. A laminated core is formed by laminating magnetic steel sheets and has a ring portion and a plurality of teeth radially extending from the ring portion. The disk drive device has a tubular vibration-deadening ring. The outer surface of the vibration-deadening ring is press-fitted into the ring portion at least at a position, along the motor's rotational axis, closer to the upper surface than to the lower surface of the laminated core; and the inner surface of the vibration-deadening ring is fixed to the side surface of the projecting portion.

18 Claims, 10 Drawing Sheets

60

600

DISK DRIVE DEVICE HAVING A VIBRATION-REDUCING ELEMENT

CROSS-REFERENCE TO RELATED APPLICATION

This application is based upon and claims the benefit of priority from the prior Japanese Patent Application No. 2009-243252, filed on Oct. 22, 2009, the entire content of which is incorporated herein by reference.

BACKGROUND OF THE INVENTION

1. Field of the Invention

The present invention relates to a disk drive device having a laminated core.

2. Description of the Related Art

A hard disk drive is known as a medium used as a storage device in a computer. In a hard disk drive, a magnetic recording disk on which recording tracks are formed is rotated at high speed by a brushless motor. A magnetic head is placed against the surface of the magnetic recording disk with a slight distance in between for the purpose of reading/writing magnetic data contained in the recording tracks.

As disclosed in Japanese Patent Application Publication No. 2007-213629, the prior brushless motor has a laminated core as a part of the stator, the core over which wire coils are wound. It is known that this laminated core is formed by laminating a plurality of magnetic steel sheets.

SUMMARY OF THE INVENTION

One of the methods for increasing the storage capacity of the hard disk drive is to narrow the width of the recording track and to make the magnetic head closer to the surface of the magnetic recording disk. The narrow interval between the magnetic head and the surface of the magnetic recording disk may cause variation in the magnitude of the interval, for example, due to vibration of the magnetic head in the direction along the rotational axis, the vibration corresponding to vibration in the direction along the rotational axis due to the laminated core. The variation of the interval between the magnetic head and the surface of the magnetic recording disk may cause variation in the amplitude of the output signal from the magnetic head. This may deteriorate the error rate of the reading/writing of data in the hard disk drive. In the worst case scenario, the magnetic head may touch the magnetic recording disk. This may cause a malfunction in the hard disk drive. The vibration in the direction along the rotational axis due to the laminated core may change the direction of the vibration while being transmitted and may vibrate the magnetic head in a planar direction. This may disturb the trace of the recording track if the width of the recording track is narrow.

The present invention addresses these disadvantages, and a general purpose of one embodiment of the present invention is to provide a disk drive device that reduces vibration.

An embodiment of the present invention relates to a disk drive device. This disk drive device comprises: a hub on which a recording disk is to be mounted; a base rotatably supporting the hub through a bearing unit, the base having, on its hub-side surface, a projecting portion that has a cylindrical side surface, the center of which is along the rotational axis of the hub; a laminated core formed by laminating steel plates, the laminated core having a ring portion and a plurality of teeth that extend radially from the ring portion; a tubular vibration-deadening ring, one side surface of which being press-fitted into the ring portion and the other side surface of which being fixed to the side surface of the projecting portion; coils wound around the plurality of teeth; and a magnet fixed to the hub, the magnet being magnetized for driving with a plurality of poles along the circumferential direction and arranged to radially face the plurality of teeth. The one side surface of the vibration-deadening ring is pressed against the ring portion at least at a position closer, in the direction along the rotational axis of the hub, to the hub-side surface of the laminated core than to the base-side surface of the laminated core.

"A disk drive device" may be a device for driving a recording disk or, more specifically, a brushless motor. Alternatively, "A disk drive device" may be a device that a recording disk is mounted on and that rotates the recording disk or, more specifically, a hard disk drive.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

The First Embodiment

The first embodiment of the present invention may preferably be applied to the hard disk drive to which a magnetic recording disk is mounted and which rotates the magnetic recording disk. In the disk drive device according to the first embodiment, a laminated core is mounted on the base plate through a vibration-deadening ring. In this case, the vibration-deadening ring is press-fitted into the laminated core. Magnetic steel sheets of the laminated core are fastened together more strongly in the direction along the rotational axis of the motor by the pressure due to the press-fitting. This can reduce the vibration caused by the laminated core.

Figure 1:
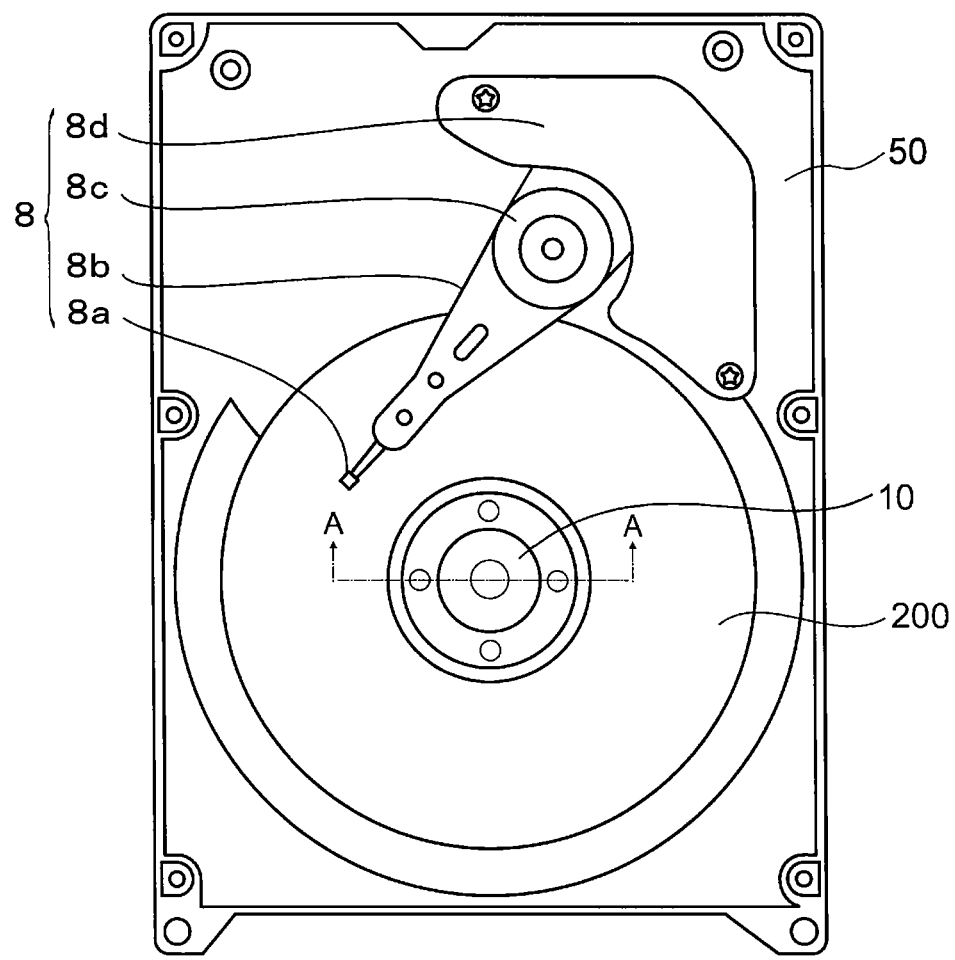
FIG. 1 is a top view of the disk drive device according to the first embodiment of the present invention.

FIG. 1 is a top view of the disk drive device 100 according to the first embodiment. In FIG. 1, the disk drive device 100 is shown without a top cover in order to show the inside of the disk drive device 100. The disk drive device 100 comprises: a base plate 50; a hub 10; a magnetic recording disk 200; a data read/write unit 8; and the top cover.

Hereinafter, it is assumed that the side of the base plate 50 on which the hub 10 is installed (upside of the plane of paper in FIG. 1) is the "upper" side.

The magnetic recording disk 200 is mounted on the hub 10, and rotates with the hub 10. The base plate 50 is produced by die-casting an alloy of aluminum. The base plate 50 rotatably supports the hub 10 through a bearing unit to be described. The data read/write unit 8 includes: a read/write head 8a; a swing arm 8b; a pivot assembly 8c; and a voice coil motor 8d. The read/write head 8a is attached to the tip of the swing arm 8b. The read/write head 8a records data onto and reads out data from the magnetic recording disk 200. The pivot assembly 8c swingably supports the swing arm 8b with respect to the base plate 50 around the head rotation axis. The voice coil motor 8d swings the swing arm 8b around the head rotation axis and moves the read/write head 8a to the desired position on the recording surface of the magnetic recording disk 200. The data read/write unit 8 is constructed using a known technique for controlling the position of the head.

Figure 2:
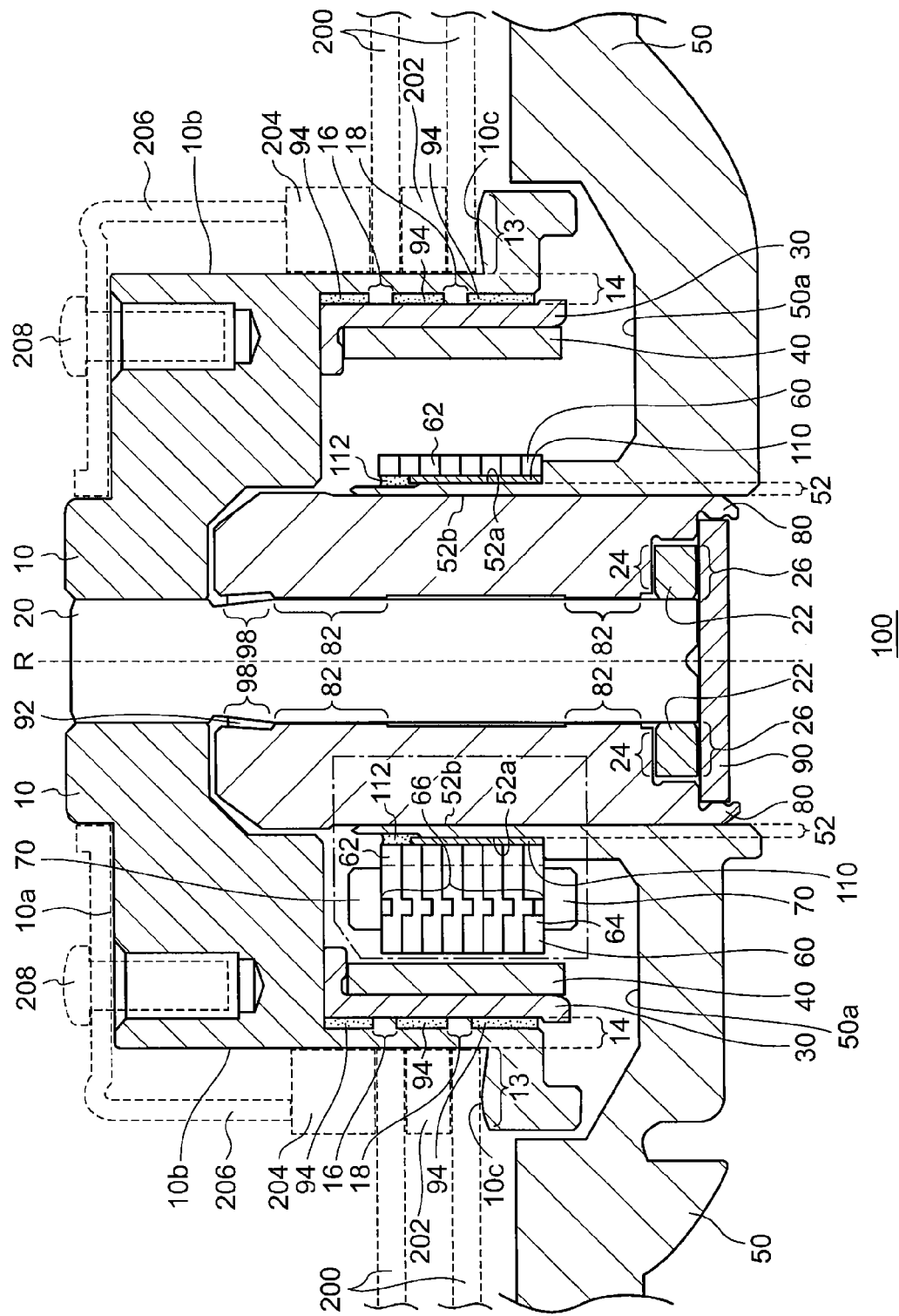
FIG. 2 is a view that is sectioned along the line A-A, as illustrated in FIG. 1.

FIG. 2 is a view that is sectioned along the line A-A, as illustrated in FIG. 1. The disk drive device 100 has and rotates two 3.5 inch-type magnetic recording disks 200 of 95 mm in diameter. Each of the two magnetic recording disks 200 of interest has a central hole of 25 mm in diameter. The thickness of each is 1.27 mm.

The disk drive device 100 comprises a substantially cup-shaped hub 10, a shaft 20, a flange 22, a yoke 30, a cylindrical magnet 40, a base plate 50, a laminated core 60, coils 70, a sleeve 80, a plate 90, lubricant 92, glue 94, and a vibration-deadening ring 110.

The hub 10 is formed in a convex form of which the center is the rotational axis R of the motor. Hereinafter, it is assumed that the two magnetic recording disks 200 are mounted on the hub 10. An outer-cylindrical surface 10b of the convex portion of the hub 10 is fit into the central holes of the two magnetic recording disks 200. The lower one of the two magnetic recording disks 200 is seated on a seating surface 10c that extends radially from the lower end of the outer-cylindrical surface 10b. The diameter of the outer-cylindrical surface 10b is 25 mm. More precisely, the diameter of the outer-cylindrical surface 10b is 24.978±0.01 mm.

A ring-shaped first spacer 202 is inserted between the two magnetic recording disks 200. A clamper 206 presses the two magnetic recording disks 200 and the first spacer 202 against the hub 10 via a ring-shaped second spacer 204 in order to fix them together. The clamper 206 is affixed to the top surface 10a of the hub 10 by a plurality of clamping screws 208. The hub 10 has a cylindrical separating wall 14 that is sandwiched between the yoke 30 and two magnetic recording disks 200.

The yoke 30 has a reverse L-shaped cross section and is made of a magnetic material such as iron. The yoke 30 is affixed to an inner surface of the separating wall 14 using both adhesion and press-fitting. A first convex portion 16 and a second convex portion 18 are formed on the inner surface of the separating wall 14, and the yoke 30 is pressed against the two convex portions 16, 18 in the case where the yoke 30 is press-fit. Both the first convex portion 16 and the second convex portion 18 are formed in a ring shape around the rotational axis R of the motor. The two convex portions 16, 18 are separately formed along the axial direction so that the first convex portion 16 is formed on the upper side. Glue 94 is filled in between the inner surface of the separating wall 14 and an outer surface of the yoke 30. This is realized by applying a suitable amount of glue on the inner surface of the separating wall 14 before the yoke 30 is press-fit against the hub 10.

A protruding portion 13 for seating the lower one of the two magnetic recording disks 200 that protrudes upward is formed on the seating surface 10c of the hub 10. The protruding portion 13 is formed in a ring shape around the rotational axis R of the motor. A part of the protruding portion 13 on which the magnetic recording disk is seated is a smoothly-curved surface. The cross-section of the curved surface forms an arc. As a result, a portion where the magnetic recording disk 200 touches the seating surface 10c is substantially in a shape of a circle-line.

The cylindrical magnet 40 is glued on the inner surface of the yoke 30. The cylindrical magnet 40 is made of a rare-earth material such as Neodymium, Iron, or Boron. The cylindrical magnet 40 faces radially towards nine teeth of the laminated core 60. The cylindrical magnet 40 is magnetized for driving with twelve poles along the circumferential direction. It is to be noted that the cylindrical magnet 40 is fixed to the hub 10 through the yoke 30.

One end of the shaft 20 is fixed in a hole located at the center of the hub 10 by using both a press-fit and glue. The flange 22 is press-fitted against the other end of the shaft 20.

A projecting portion 52, the center of which is along the rotational axis R of the motor, is formed on an upper surface 50a of the base plate 50. An outer surface of the projecting portion 52 is a cylindrical side surface 52a, the center of which is along the rotational axis R of the motor. The sleeve 80 is glued on an inner surface 52b of the projecting portion 52. The sleeve 80 accommodates the shaft 20. The plate 90 is glued onto a surface on the flange 22 side of the sleeve 80.

The lubricant 92 is injected in a region in between part of the rotor (the shaft 20 and the flange 22) and part of the stator (the sleeve 80 and the plate 90). The shaft 20, the flange 22, the lubricant 92, the sleeve 80, and the plate 90 constitute the bearing unit that rotatably supports the hub 10.

A pair of herringbone-shaped radial dynamic pressure grooves 82 that are vertically separated from each other are formed on the inner surface of the sleeve 80. A first herringbone-shaped thrust dynamic pressure groove 24 is formed on the upper surface of the flange 22. A second herringbone-shaped thrust dynamic pressure groove 26 is formed on the lower surface of the flange 22. The hub 10 and the shaft 20 are axially and radially supported by the dynamic pressure generated in the lubricant 92 by these dynamic pressure grooves when the disk drive device 100 rotates.

A capillary seal 98, where the gap between the inner surface of the sleeve 80 and the outer surface of the shaft 20 gradually increases upward, is formed on the opening side of the sleeve 80. The capillary seal 98 prevents the leakage of the lubricant 92 by way of the capillary effect.

The laminated core 60 has a ring portion 62 and nine teeth 64 that extend out radially from the ring portion 62. The laminated core 60 is formed by laminating eight nondirectional magnetic steel sheets, each of which has the thickness of 0.35 mm, and mechanically integrating them. In one of the methods for manufacturing this laminated core 60, first, each of the magnetic steel sheets is formed by stamping out a base magnetic steel sheet the surface of which is insulated, so that a desired core-shape with a half-punch to be described is obtained. Second, eight core-shaped magnetic steel sheets are mechanically integrated in a mold using the above-mentioned half-punch. After this integration, the surface of the laminated core is treated, for example, in order to prevent the abrasion of the surface of the laminated core. Many methods can be used for this surface treatment. For example, a method in which an epoxy resin is applied by a spray coating or a method using a cation electrodeposition coating is advantageous in that the thickness of the film can be made uniform. Here, the epoxy resin is applied so that its thickness is about 70 µm. Therefore, in the present embodiment, the thickness T1 of the laminated core 60 is about 2.94 mm.

Each of the coils 70 is wound around one of the nine teeth 64, respectively. A driving flux is generated along the tooth 64 by applying a three-phase sinusoidal driving current through the coils 70.

The vibration-deadening ring 110 is a tubular part that is made of material softer than the magnetic steel sheet of the laminated core 60. Aluminum, which is light and easily worked, is one example of such material. The vibration-deadening ring 110 is located in between the laminated core 60 and the projecting portion 52. The vibration-deadening ring 110 further fastens, in the axial direction, each magnetic steel sheet of the laminated core 60 by being press-fitted into the ring portion 62 of the laminated core 60.

Figure 3:
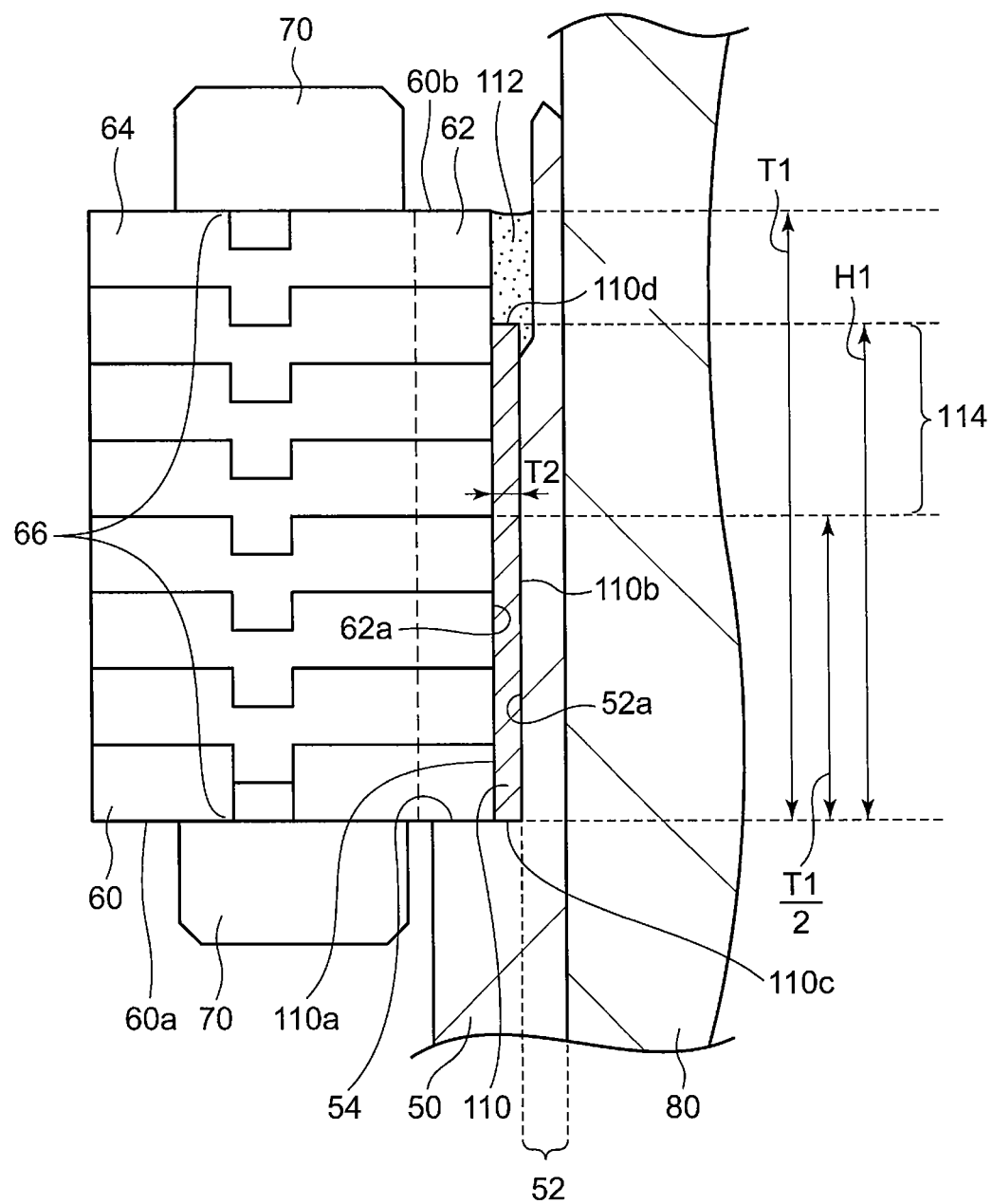
FIG. 3 is a magnified view of the region that is surrounded by a dashed-dotted line in FIG. 2.

FIG. 3 is a magnified view of the region that is surrounded by a dashed-dotted line in FIG. 2. An outer surface 110a of the vibration-deadening ring 110 is press-fitted in the ring portion 62. Therefore, the outer surface 110a of the vibration-deadening ring 110 is pressed against the inner surface 62a of the ring portion 62. The outer surface 110a of the vibration-deadening ring 110 is press-fitted to the extent where the lower surface 110c of the vibration-deadening ring 110 comes to substantially the same axial height as the lower surface 60a of the laminated core 60. After the vibration-deadening ring 110 is press-fitted into the ring portion 62, the laminated core 60 with the vibration-deadening ring 110 is fitted to the projecting portion 52 so that the lower surface 60a of the laminated core 60 meets the seat 54 which extends radially from the lower end of the cylindrical side surface 52a of the projecting portion 50. Then, the laminated core 60 with the vibration-deadening ring 110 is fixed to the projecting portion 50. The means for the fixing is, for example, gluing or press-fitting. In this case, it is less likely to generate contaminants such as particles.

The length (height) H1, in the axial direction, of the vibration-deadening ring 110 is arranged to be 1.8 mm. The vibration-deadening ring 110 is press-fitted into the ring portion 62 over the entire height H1. Since the thickness T1 of the laminated core 60 is 2.94 mm, the disk drive device 100 according to the present embodiment is arranged so that the following relationship is realized:

$T1 > H1 =$ (the press-fit length in the direction along the rotational axis R of the motor) $> 0.5*T1$.

The term "the press-fit length" means the length, in the axial direction, of the portion where the outer surface 110a of the vibration-deadening ring 110 is to be pressed against the inner surface 62a of the ring portion 62. From a different point of view, the outer surface 110a of the vibration-deadening ring 110 is pressed against the inner surface 62a of the ring portion 62 at least at the position rather close, in the direction along the rotational axis R of the motor, to the upper surface 60b of the laminated core 60 than to the lower surface 60a of the laminated core 60. In FIG. 3, the position mentioned above is the range 114, the range 114 beginning at the point above the lower surface 60a of the laminated core 60 at a height that is equal to half of the thickness T1 of the laminated core 60 and ending at the upper surface 110d of the vibration-deadening ring 110.

In order to more strongly affix the laminated core 60 to the base plate 50, in addition to the fixation using the vibration-deadening ring 110, vibration-deadening glue 112 is introduced in the region between the inner surface 62a of the ring portion 62 and the side surface 52a of the projecting portion 52 where the vibration-deadening ring 110 is not present. For example, the vibration-deadening glue 112 is introduced so that the region is filled with the vibration-deadening glue 112. This would reduce the possibility of the laminated core 60 leaning with respect to the projecting portion 52. Even if some impact is given to the laminated core 60, the vibration-deadening glue 112 would support the laminated core 60 straight with respect to the projecting portion 52. As a result, it is possible to maintain the uniformity of the gap between the tooth 64 and the cylindrical magnet 40.

Several kinds of glue can be adopted as the vibration-deadening glue 112. For example, thermosetting epoxy-resin glue is preferable in that stable adhesion strength can be obtained.

In the state before the vibration-deadening ring 110 is press-fitted into the ring portion 62, the difference Dif (=R1−R2, the press-fit allowance) between the radius R1 of the outer surface 110a of the vibration-deadening ring 110 and the radius R2 of the inner surface 62a of the ring portion 62 is arranged to be at a range of 40 µm to 80 µm. Since the press-fit happens, R1>R2 and Dif>0. If the press-fit allowance Dif is relatively small, the after-mentioned vibration-deadening effect of the vibration-deadening ring 110 may not be sufficient. According to the experience of the present inventors as those skilled in the art, the dimensions of the inner surface or the outer surface may vary by about 30 µm in the manufacturing process. In the case where the press-fit allowance Dif is arranged to be more than 40 µm, it is possible to secure no less than 10 µm of the press-fit allowance under the above-mentioned dimension variation. This may guarantee the vibration-deadening effect of the vibration-deadening ring 110. If the press-fit allowance Dif is over 120 µm, it is possible that the process of press-fitting takes more time and that the laminated core becomes deformed. However, in the case where the press-fit allowance Dif is arranged to be less than 80 µm, it is possible to prevent the press-fit allowance to be more than 120 µm even if the press-fit section has dimensional variation.

The wall thickness T2 of the vibration-deadening ring 110 is arranged to be at a range of 0.3 mm to 5.0 mm, or specifically, to be 0.8 mm. If the thickness T2 is in this range, it is possible to reduce the possibility of deformation during press-fitting while saving sufficient space for the laminated core 60.

Regarding the method for assembling the laminated core 60, the vibration-deadening ring 110, and the projecting portion 52, in the above-mentioned method, first the vibration-deadening ring 110 is press-fitted to the laminated core 60. Then, the laminated core 60 to which the vibration-deadening ring 110 has been affixed is fitted to the projecting portion 52. In this case, each step can be done independently. Therefore, work efficiency can be increased. In addition, chips generated during the process of the press-fit can be removed easily, which is preferred. Alternatively, the vibration-deadening ring 110 may be fitted to the projecting portion 52 first. Then the laminated core 60 may be press-fitted to the vibration-deadening ring 110. In this case, since the vibration-deadening ring 110 is mounted on the projecting portion 52 without the laminated core 60, this process of mounting becomes easier.

Figure 4:
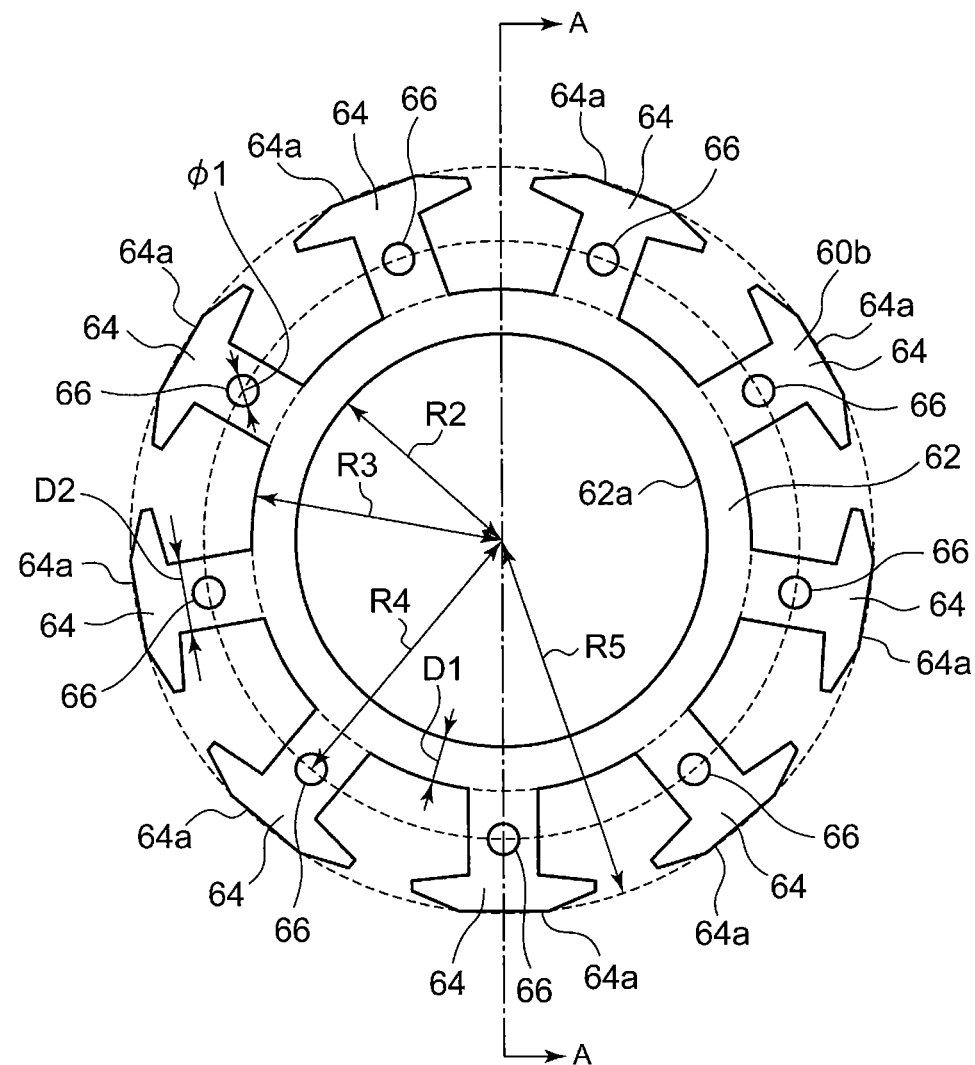
FIG. 4 is a top view of the laminated core as shown in FIG. 2.

FIG. 4 is a top view of the laminated core 60 as shown in FIG. 2. The line A-A as illustrated in FIG. 4 corresponds to the cross-section of FIG. 2. Each of the nine teeth 64 of the laminated core 60 has a swaged portion 66 formed by a half-punching process. The swaged portion 66 fastens the magnetic steel sheets of the laminated core 60 together through above-mentioned mechanical integration in mold. The swaged portion 66, in cooperation with the vibration-deadening ring 110, couples the magnetic steel sheets of the laminated core 60 together, in the axial direction.

The reason why the half-punching process is adopted for the swaged portion 66 is described below:

Mechanical integration methods other than the half-punching process include a method in which through holes situated in the axial direction are made in the teeth of the laminated core, and those teeth are pressure-contacted together using aluminum rivets. In this method, the magneto resistance around the through holes may increase, and the flux may decrease. This may reduce the torque of the motor. To cope with this, in the present embodiment, the half-punching process is used, and no hole is arranged on the teeth portions of the magnetic steel sheets. This allows for a sufficient amount of flux flowing through the teeth of the laminated core 60.

The swaged portion 66 is formed at a position, in the radial direction, that rather is closer to an end portion 64a of the tooth 64 than to the inner surface 62a of the ring portion 62. The swaged portions 66 are formed on a circle with radius R4. This radius R4 is greater than the average of the radius R2 of the inner surface 62a of the ring portion 62 and the radius R5 of a circle on which the end portions 64a of the teeth 64 are formed.

$$R4>(R2+R5)/2.$$

The laminated core 60 is formed so that the width D1, in the radial direction, of the ring portion 62 is smaller than the width D2, in the circumferential direction, of a portion of the tooth 64, the coil 70 being wound around the portion. Specifically in the present embodiment, D1 is substantially equal to half of D2.

Dimensions of the laminated core 60 used in the present embodiment are: R2=6.8 mm; (the radius R3 of the outer surface of the ring portion 62)=8 mm, R4=9.8 mm; (the diameter φ1 of the swaged portion 66)=1.0 mm; and R5=12.2 mm. Therefore, the width D1 is equal to 1.2 mm. The width D2 is equal to 2.4 mm. The distance, in the radial direction, between the center of the swaged portion 66 and the end portion 64a of the tooth 64 is equal to 2.4 mm. The distance, in the radial direction, between the center of the swaged portion 66 and the inner surface 62a of the ring portion 62 is equal to 3 mm.

The operation of the disk drive device 100 as described above shall be described below. The three-phase driving current is supplied to the disk drive device 100 to rotate the hub 10 of the disk drive device 100. The driving fluxes are generated along the nine teeth 64 by making the driving current flow through the coils 70. These driving fluxes give torque to the cylindrical magnet 40, and the hub 10 rotates.

In the disk drive device 100 according to the present embodiment, the outer surface 110a of the vibration-deadening ring 110 is pressed against the inner surface 62a of the ring portion 62 at least at the position, in the direction along the rotational axis R of the motor, rather that is closer to the upper surface 60b of the laminated core 60 than to the lower surface 60a of the laminated core 60. Therefore, in addition to the fixation due to the swaged portions 66, the magnetic steel sheets included in the laminated core 60 are fastened together more strongly in the axial direction by being sandwiched between this pressing position and the seat 54 where the lower surface 60a of the laminated core 60 hits. Here, this pressing position and the seat 54 are separated by more than half of the thickness T1 of the laminated core 60. As a result, the vibration, in the direction along the rotational axis R of the motor, of the laminated core 60 (this vibration is hereinafter referred to as "core vibration") can be suppressed. This will be explained below.

In the case where the coils 70 are wound around the nine teeth 64 of the laminated core 60 and the alternate driving current is supplied to the coils 70, eddy currents are generated in each of the magnetic steel sheets included in the laminated core 60, due to the time-variation of the flux. This eddy current causes a repulsion force between the magnetic steel sheets (this force is hereinafter referred to as an "inter-layer force"). The more the time-derivative of the driving current is, the stronger the inter-layer force is. The inter-layer force varies with the variation of the time-derivative of the driving current. Each of the magnetic steel sheets of the laminated core 60 vibrates in the axial direction in response to the variation of the inter-layer force. This is one of the reasons for the core vibration. In the case where the disk drive device 100 is three-phase driven, the driving current in each phase is supplied at the timing different from another phase by 2π/3 in the electric angle. As a result, the teeth 64 corresponding to each phase generate vibration at the timing different from the teeth corresponding to other phases. Therefore, the vibrations of the teeth 64 corresponding to all phases are combined together; thereby the alternation frequency of the core vibration becomes three times as much as that of the single phase driving. The more the driving current is, the more the core vibration becomes. Since the eddy current increases, if the alternation frequency of the driving current increases, the core vibration increases accordingly.

Figure 5:
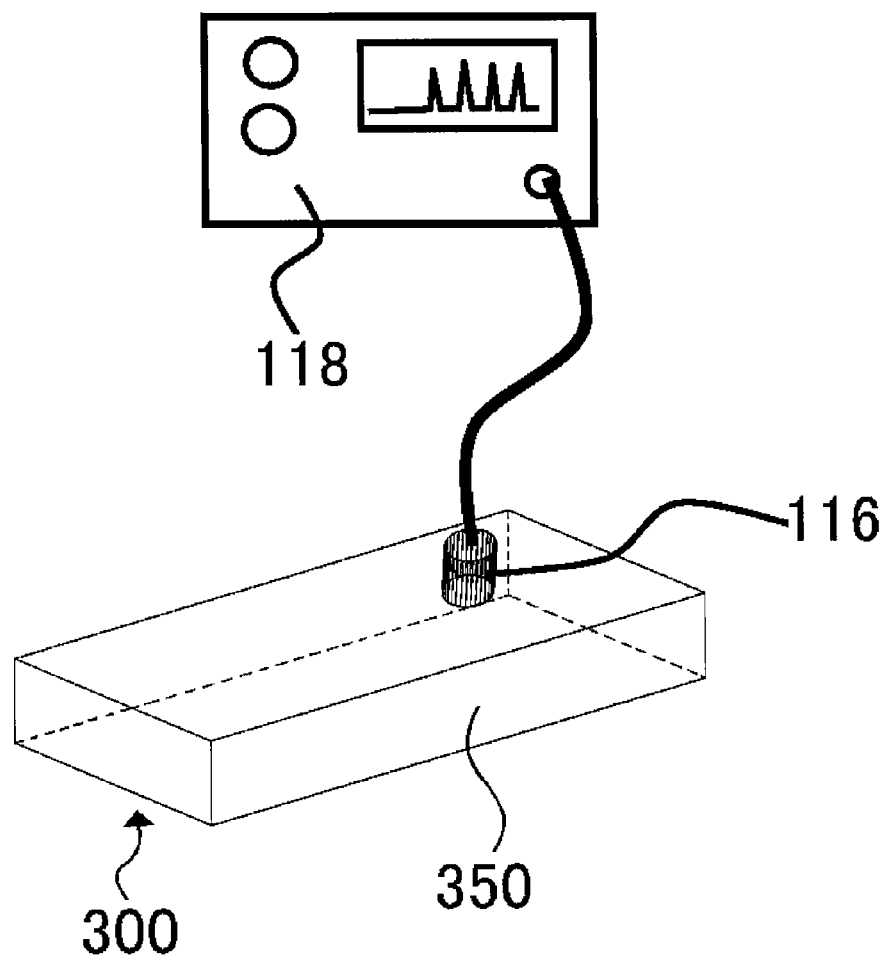
FIG. 5 explains the method for measuring the vibration of the disk drive device when the magnetic recording disk is rotating.

FIG. 5 explains the method for measuring the vibration of the disk drive device when the magnetic recording disk is rotating. An acceleration sensor 116 is attached to a base plate 350 of a disk drive device 300. This acceleration sensor 116 converts the vibration of the disk drive device 300 to an electric signal and outputs it. The vibration spectrum can be obtained by inputting the output of the acceleration sensor 116 to the FFT (Fast Fourier Transform) analyzer 118.

First, the present inventors performed an experiment in which the vibration-deadening ring 110 was not used, for the purpose of comparison. In this comparison experiment, the inventors manufactured a disk drive device according to the comparison, in which the ring portion 62 of the laminated core 60 was glued to the projecting portion 52 of the base plate 50 by a clearance fit. The vibration spectrum was observed under the condition that the disk drive device was rotated at the rotational frequency N=120 Hz (7200 rpm). The other conditions of the disk drive device according to the comparison were set to be equivalent to those of the disk drive device 100 according to the present embodiment.

Figure 6:
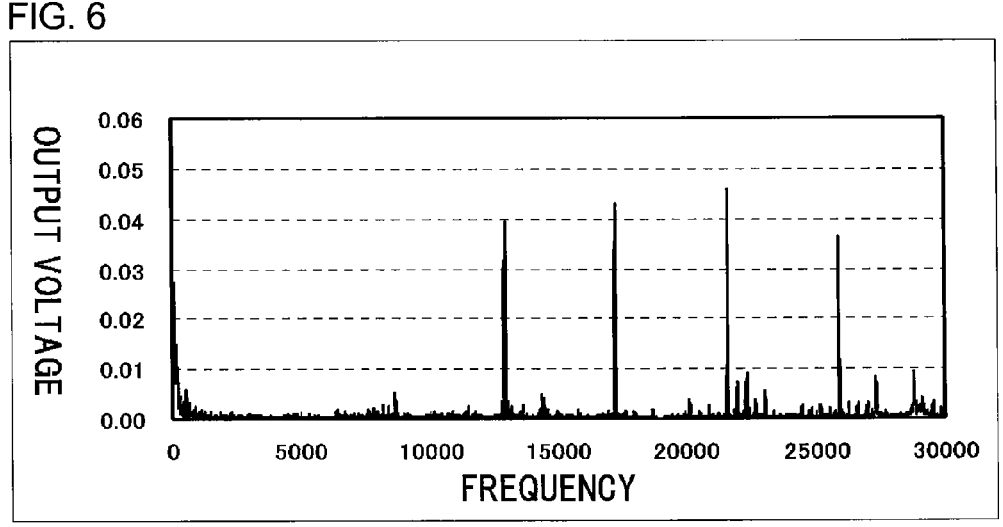
FIG. 6 is a graph that shows the vibration spectrum of the core vibration in the disk drive device according to the comparison.

FIG. 6 is a graph that shows the vibration spectrum of the core vibration in the disk drive device according to the comparison. The horizontal axis shows the frequency in Hz, and the vertical axis shows the frequency component of the output voltage from the acceleration sensor 116 in arbitral units. The higher the output voltage is, the more the vibration is. In this vibration spectrum, the vibrations are large at 12960 Hz, 17280 Hz, 21600 Hz, and 25920 Hz.

Frequencies are considered at which the vibration is large in the vibration spectrum shown in FIG. 6. In the situation where the number P of magnetic poles of the cylindrical magnet 40 is 12 and where the coils 70 are three-phase driven, the frequency F0 of the basic wave of the driving current of each phase is given by the following equation 1.

$$F0=PN/2=12\ poles*120\ Hz/2=720\ Hz \quad \text{(equation 1)}.$$

Therefore, the frequencies at which the vibration is large in the vibration spectrum shown in FIG. 6 correspond to eighteen times the frequency F0 of the basic wave, twenty four times the frequency F0 of the basic wave, thirty times the frequency F0 of the basic wave, and thirty six times the frequency F0 of the basic wave, respectively. In other words, the laminated core of the disk drive device according to the comparison generates the core vibration, the frequencies of which are eighteen times the frequency F0 of the basic wave, twenty four times the frequency F0 of the basic wave, thirty times the frequency F0 of the basic wave, and thirty six times the frequency F0 of the basic wave. The observation above can be generalized as below. It is assumed that a disk drive device comprises a cylindrical magnet magnetized for driving with P poles, where P is even number. It is also assumed that a three-phase driving current is supplied to the disk drive device and that the disk drive device is rotated at the rotational frequency of N (Hz). In this case, in the vibration spectrum, the vibration is larger at at least one of 9PN (Hz), 12PN (Hz), 15PN (Hz), and 18PN (Hz) than at the frequencies other than mentioned. Therefore, by suppressing these frequency components in the vibration spectrum, the whole core vibration can be reduced more efficiently. In other words, in the case where, out of the vibration of the disk drive device, the component corresponding to at least one of 9PN (Hz), 12PN (Hz), 15PN (Hz), and 18PN (Hz) is significantly reduced (for example, is made smaller than the component corresponding to the frequency near DC), the whole vibration of the disk drive device can be reduced more efficiently. As a result, the vibration of the read/write head 8a can be reduced, and the error rate of the read/write can be improved.

Since the eddy current increases if the alternation frequency of the driving current increases, it was confirmed by the inventors that the core vibration became notably large in the case where the frequency F0 (=PN/2) of the basic wave of the driving current was greater than or equal to 0.5 kHz.

In the disk drive device 100 according to the present embodiment, the magnetic steel sheets included in the laminated core 60 are fastened in the axial direction together by, in addition to the fixation due to the swaged portions 66, the vibration-deadening ring 110. Therefore, the movement, in the axial direction, of the magnetic steel sheets is suppressed. As a result, the core vibration of the laminated core 60 is suppressed even if the inter-layer force is generated.

Figure 7:
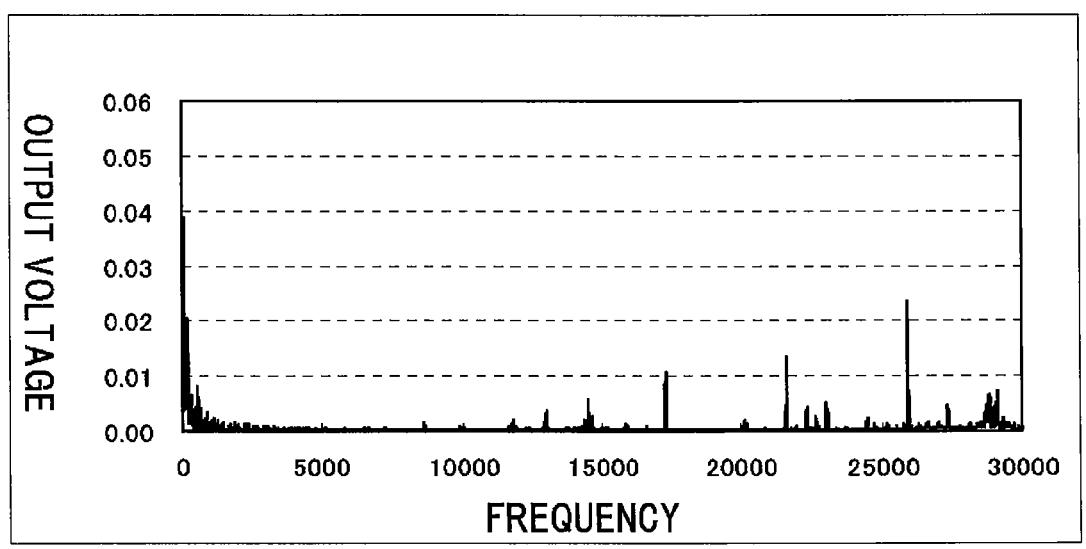
FIG. 7 is a graph that shows the vibration spectrum of the core vibration in the disk drive device according to the embodiment of the present invention.

FIG. 7 is a graph that shows the vibration spectrum of the core vibration in the disk drive device 100 according to the present embodiment. The horizontal axis shows the frequency in Hz, and the vertical axis shows the frequency component of the output voltage from the acceleration sensor 116 in the same units as in FIG. 6. As shown in this vibration spectrum, in the disk drive device 100 according to the present embodiment, the components of the core vibration corresponding to eighteen times the frequency F0 of the basic wave, twenty four times the frequency F0 of the basic wave, thirty times the frequency F0 of the basic wave, and thirty six times the frequency F0 of the basic wave are suppressed. Those components are smaller than the component corresponding to the frequency near DC. In the disk drive device 100 according to the present embodiment, the core vibration is suppressed. Therefore, the error rate of the read/write is reduced, and the reliability is improved.

In the disk drive device 100 according to the present embodiment, the outer surface 110a of the vibration-deadening ring 110 is press-fitted into the ring portion 62 over a length longer than the half of the thickness T1 of the laminated core 60 in the direction along the rotational axis R of the motor. Therefore, the magnetic steel sheets included in the laminated core 60 can be fastened more strongly in the axial direction together by the pressure due to the press-fit than with the case where the press-fit length is short, for example shorter than the half of the thickness T1 of the laminated core 60. As a result, the core vibration due to the inter-layer force can be suppressed.

With regard to the press-fit length, the vibration-deadening effect due to the vibration-deadening ring 110 may not be sufficient if the press-fit length is relatively short. On the other hand, if the press-fit length is relatively long, it would take time to make a press-fit due to large press-fit resistance. Also, the laminated core 60 may deform due to the large press-fit resistance. Therefore, the press-fit length may be determined according to experiment so that the core vibration when the magnetic recording disk 200 is rotating is in the allowable range. For example, the vibration spectrum of the core vibration is measured by the measurement method described in relation to FIG. 5. Then, the press-fit length is determined according to the measurement results of components of the vibration spectrum, in particular components corresponding to the frequencies of 9PN (Hz), 12PN (Hz), 15PN (Hz), and 18PN (Hz).

In a laminated core formed by laminating magnetic steel sheets, in general, the laminated core may have a concavo-convex side surface due to manufacturing errors in each magnetic steel sheet. This concavo-convex side surface can be one of the reasons why the press-fit resistance increases between the vibration-deadening ring and the ring portion of the laminated core. In order to keep the press-fit resistance at a fair range, the press-fit allowance may have to be limited according to the expected amount of increase in the press-fit resistance due to the concavo-convex side surface. However, in light of the variation in dimensions when manufacturing the laminated core 60 or the vibration-deadening ring 110, it would be better to have less of such limitation for the press-fit allowance. Therefore, in the disk drive device 100 according to the present embodiment, the vibration-deadening ring 110 is made of a material that is softer than the magnetic steel sheets that form the laminated core 60. As a result, even if the inner surface 62a of the ring portion 62 is concavo-convex, the amount of increase in the press-fit resistance due to the concavo-convexity can be suppressed, and a sufficient press-fit allowance can be obtained.

The outer surface 110a of the vibration-deadening ring 110 may be formed so that the outer surface 110a corresponds to the concavo-convex inner surface 62a of the ring portion 62, the inner surface 62a sticking out and sinking in layer by layer of the magnetic steel sheet. In this case, the amount of increase in the press-fit resistance can be suppressed.

In the present embodiment, the Vickers hardness of the laminated core 60 is at a range from 120 Hv to 200 Hv. The Vickers hardness of the vibration-deadening ring 110 is at a range from 80 Hv to 100 Hv.

In the disk drive device 100 according to the present embodiment, the swaged portion 66 is formed at the position rather that is closer, in the radial direction, to an end portion 64a of the tooth 64 than to the inner surface 62a of the ring portion 62. Therefore, the core vibration can be reduced on the end-portion side of the tooth 64. In particular, with regard to the structure such as the disk drive device 100 according to the present embodiment where the end portion of the tooth 64 is not fixed to the base plate 50, a relatively large core vibration may occur at the end portion of the tooth 64. Such core vibration can be suppressed by having the swaged portion 66 on the end-portion side.

The middle portion of the tooth 64 is in between the swaged portion 66 and the inner surface 62a of the ring portion 62. This can further reduce the core vibration.

The width D1, in the radial direction, of the ring portion 62 of the laminated core 60 will be investigated below. Under the condition that the size of the disk drive device 100, as a whole, is unchanged, the larger the width D1 is, the shorter the teeth 64 may be and the less the number of turns of the coil 70 may be. Since the inductance of the coil 70 decreases if the number of turns decreases, it is necessary to increase the driving current in order to keep the driving torque equivalent to the driving torque before the number of turns is reduced. However, the increase of the driving current may deteriorate the electrical efficiency. In addition, since the inter-layer force may become stronger, the core vibration may increase. To cope with this, in the disk drive device 100 according to the present embodiment, the laminated core 60 is formed so that the width D1, in the radial direction, of the ring portion 62 is smaller than the width D2, in the circumferential direction, of a portion of the tooth 64, the coil 70 being wound around the portion. In this structure, the width D1, in the radial direction, of the ring portion 62 is relatively small. Therefore, the driving current can be relatively reduced, and the core vibration can be suppressed.

The ring portion 62 of the laminated core 60 is a path of the flux generated in the teeth 64 by the coils 70 wound around the teeth 64. In particular, the flux generated in one tooth 64 is split into two halves at the root of the tooth 64, each of the two halves of the flux entering into the ring portion 62 in a direction opposite of each other. Therefore, if the width D1, in the radial direction, of the ring portion 62 is made too narrow, the ring portion 62 may reach magnetic saturation, and the magneto resistance may increase. The larger the magneto resistance of the ring portion 62 is, the less the flux flowing through the teeth 64 may be. Therefore, it is necessary to increase the driving current in order to keep the sufficient driving torque. However, the increase of the driving current may deteriorate the electrical efficiency. In addition, since the inter-layer force may become stronger, the core vibration may increase. To cope with this, in the disk drive device 100 according to the present embodiment, the laminated core 60 is formed so that the width D1, in the radial direction, of the ring portion 62 substantially is half of the width D2, in the circumferential direction, of the portion of the tooth 64, the coil 70 being wound around the portion. This design would be the optimal in light of the magnetic saturation described above.

In the disk drive device 100 according to the present embodiment, the laminated core 60 is formed by laminating eight magnetic steel sheets. The present inventors obtained the following perception with regard to the number of magnetic steel sheets that form the laminated core.

There is a tendency that the core vibration increases based on the number of magnetic steel sheets of the laminated core. Therefore, it is preferable to apply the concept of the present embodiment to a laminated core formed by laminating more than six magnetic steel sheets, the thickness of each being 0.35 mm, in that the core vibration may be suppressed. The pressure necessary to press-fit the vibration-deadening ring increases if the number of magnetic steel sheets increases. This large pressure may deform the laminated core. In addition, it would take long time to work with this large pressure since a large force is required. Therefore, preferably, the number of magnetic steel sheets included in the laminated core is less than or equal to twenty.

In the case where an magnetic steel sheet of the thickness 0.2 mm is used, it is preferable to apply the concept of the present embodiment to a laminated core formed by laminating more than eight magnetic steel sheets, the thickness of each being 0.2 mm, in that the core vibration may be suppressed. According to the reason similar to above, preferably, the number of magnetic steel sheets is less than or equal to thirty.

The Second Embodiment

The first embodiment explains the situation where the magnetic steel sheets of the laminated core are strongly tied together by using the vibration-deadening ring 110. The second embodiment relates to a disk drive device in which a vibration-deadening ring is not used and a laminated core is directly mounted to the projecting portion. In the disk drive device according to the second embodiment, when the laminated core is mounted to the projecting portion, the projecting portion is plastically deformed and pressed against the ring portion 62. By doing so, the magnetic steel sheets of the laminated core are strongly tied together.

Figure 8:
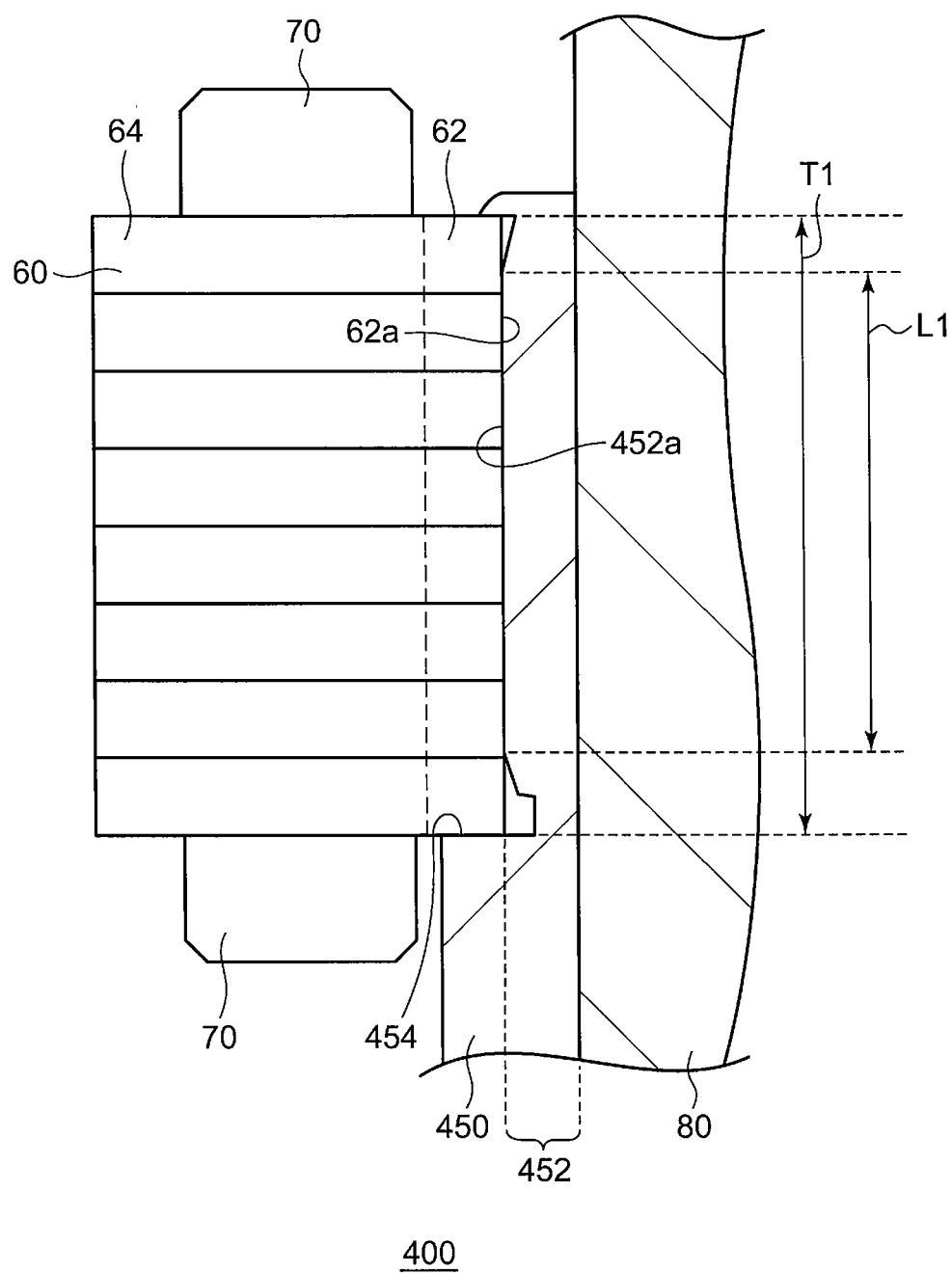
FIG. 8 is a magnified cross section, which magnifies the relevant part of the cross section of the disk drive device according to the second embodiment of the present invention.

FIG. 8 is a magnified cross section, which magnifies the relevant part of the cross section of the disk drive device 400 according to the second embodiment. FIG. 8 corresponds to FIG. 3 of the first embodiment. To ease understanding, the swaged portion 66 is omitted in FIG. 8. A projecting portion 452, the center of which being along the rotational axis R of the motor, is formed on an upper surface 450a of the base plate 450 of the disk drive device 400. An outer surface of the projecting portion 452 is a cylindrical side surface 452a, the center of which being along the rotational axis R of the motor. The cylindrical side surface 452a is pressed against the inner surface 62a of the ring portion 62 over the almost entire surface. A portion, of the cylindrical side surface 452a, that contributes the pressing has a length L1, in the direction along the rotational axis R of the motor, longer than half of the thickness T1 of the laminated core 60. The other structures of the disk drive device 400 are similar to those of the disk drive device 100 according to the first embodiment.

A method for mounting the laminated core 60 to the projecting portion 452 will be explained below. First, before mounting the laminated core 60 to the projecting portion 452, the radius of the inner surface 62a of the ring portion 62 is formed as larger than the radius of the side surface 452a of the projecting portion 452. In particular, it is preferable to form the ring portion 62 and the projecting portion 452 so that the laminated core 60 is loosely-fitted to the projecting portion 452, in that the fitting process becomes easier. Then, the laminated core 60 is fitted along the side surface 452a of the projecting portion 452. The laminated core 60 is positioned by making the lower surface of the laminated core 60 hit the seat 454 of the base plate 450. After that, the hub 10 side-end portion of the projecting portion 452 is plastically deformed, for example, by pressing. In the end, the plastically-deformed end portion extends above the laminated core 60, as shown in FIG. 8. This extending portion fastens, in the direction along the rotational axis R of the motor, the laminated core 60. Since the side surface 452a of the projecting portion 452 swells outward in the radial direction due to the pressing, the side surface 452a of the projecting portion 452 is pressed against the inner surface 62a of the ring portion 62.

In the disk drive device 400 according to the present embodiment, the laminated core 60 is fixed to the projecting portion 452 without the vibration-deadening ring. Therefore, the process in which the vibration-deadening ring 110 is press-fitted into the ring portion 62 and is fixed to the projecting portion 52 can be omitted, compared with the disk drive device 100 according to the first embodiment.

In the disk drive device 400 according to the present embodiment, the laminated core 60 is fixed, in the direction along the rotational axis R of the motor, by being sandwiched between the extending portion of the projecting portion 452 and the seat 454. In addition, the laminated core 60 is fixed, in the radial direction, by pressure exerted from the side surface 452a of the projecting portion 452. This can suppress the core vibration more effectively. In light of the suppression of the core vibration, the side surface 452a of the projecting portion 452 that swells outward in the radial direction plays a role similar to that of the vibration-deadening ring 110 of the disk drive device 100 according to the first embodiment.

It is preferable to adopt a metallic material such as Aluminum as the material for forming the projecting portion 452 because the connection strength becomes less deteriorated through aging. It is also preferable to adopt a resin material such as polyether imides because the degree of freedom in form is high and therefore the design can be done more easily.

Above is an explanation based on the exemplary embodiments. These embodiments are intended to be illustrative only, and it will be obvious to those skilled in the art that various modifications to constituting elements could be developed and that such modifications are also within the scope of the present invention.

The first and the second embodiments describe the so-called integrated disk drive device, in which the base plate rotatably supports the hub. However, the present invention is not limited to this. For example, a brushless motor having a structure similar to that of FIG. 2 can be manufactured separately, and the manufactured brushless motor can be installed on the chassis of a hard disk drive.

The first embodiment describes the case where the height H1 of the vibration-deadening ring 110 is smaller than the thickness T1 of the laminated core 60 and where the vibration-deadening ring 110 is press-fitted into the ring portion 62 over the entire height H1. However, the present invention is not limited to this. Two modifications to the vibration-deadening ring 110 will be explained below.

Figure 9:
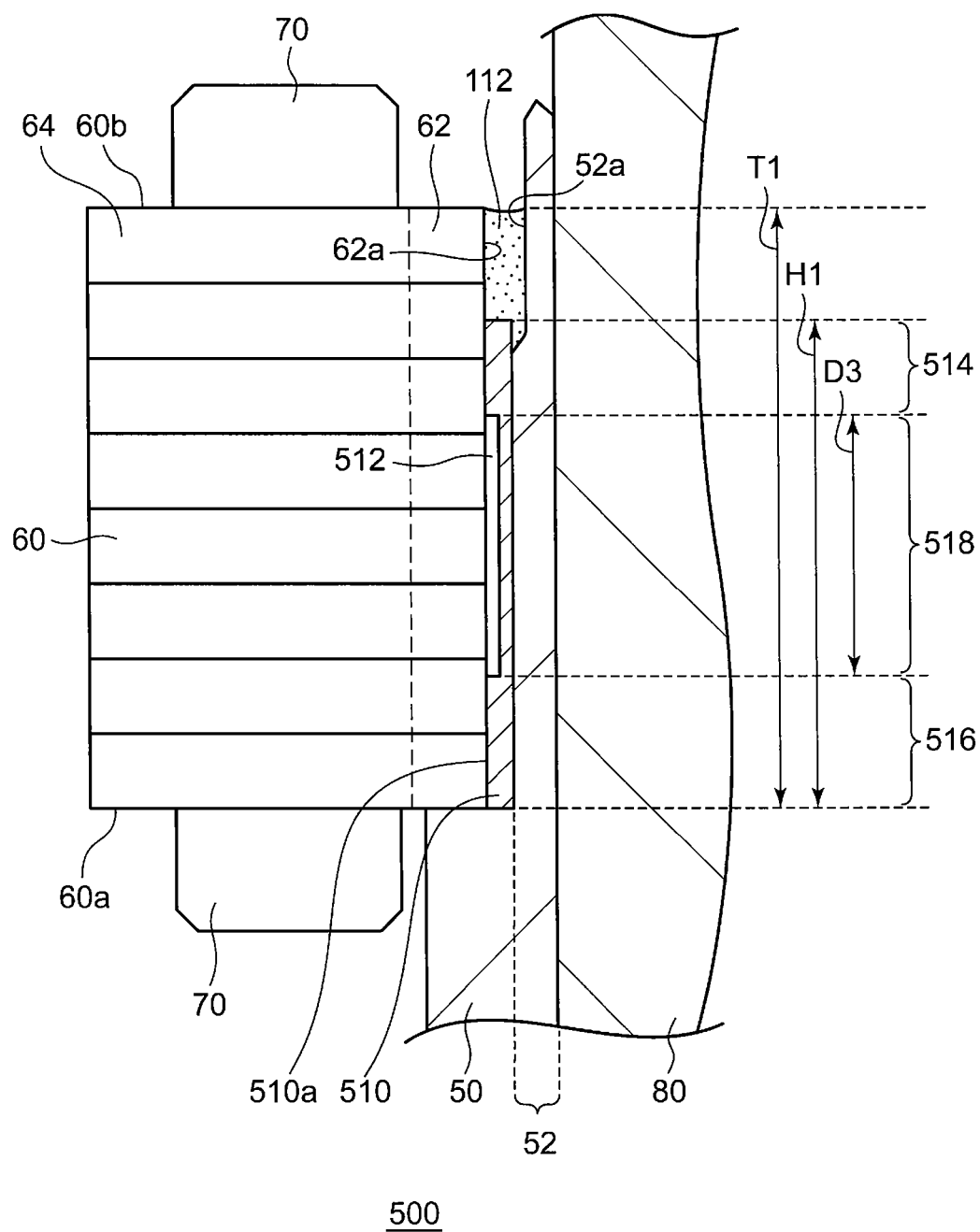
FIG. 9 is a magnified cross section, which magnifies the relevant part of the cross section of the disk drive device that includes the vibration-deadening ring according to the first modification.

FIG. 9 is a magnified cross section, which magnifies the relevant part of the cross section of the disk drive device 500 that includes the vibration-deadening ring 510 according to the first modification. FIG. 9 corresponds to FIG. 3 of the first embodiment. To ease understanding, the swaged portion 66 is omitted in FIG. 9. The vibration-deadening ring 510 is made so that an annular concave portion 512, the center of which being along the rotational axis R of the motor, of width D3 is formed on the outer surface, of the vibration-deadening ring 110 according to the first embodiment, near its center in the direction along the rotational axis R of the motor. In the case where the vibration-deadening ring 510 is press-fitted into the ring portion 62, a press-fit section between the outer surface 510a of the vibration-deadening ring 510 and the ring portion 62 has a third section 518 where the outer surface 510a of the vibration-deadening ring 510 does not touch the inner surface 62a of the ring portion 62, the third section 518 being in between the first section 514 and the second section 516. In both the first section 514 and the second section 516, the outer surface 510a of the vibration-deadening ring 510 is pressed against the inner surface 62a of the ring portion 62.

In the disk drive device 500 according to the present modification, the outer surface 510a of the vibration-deadening ring 510 is pressed against the inner surface 62a of the ring portion 62 at least at the position closer, in the direction along the rotational axis R of the motor, to the upper surface 60b of the laminated core 60 than to the lower surface 60a of the laminated core 60, as described in relation to the disk drive device according to the first embodiment. Therefore, the core vibration can be reduced as described in relation to the first embodiment. In addition, since the laminated core is fixed by being sandwiched between the first section 514 and the second section 516, the strength of the fixation comparable to that for the case where the whole outer surface of the vibration deadening ring contributes to the press-fit can be realized. Furthermore, in the present modification, a portion corresponding to the annular concave portion 512 does not contribute to the press-fit, unlike the first embodiment. Therefore, the press-fit resistance can be reduced. Alternatively, a plurality of annular concave portions may be formed. Alternatively, a concave portion in the direction along the rotational axis R of the motor may be formed on the outer surface 110a of the vibration-deadening ring 110 in place of the annular concave portion.

Figure 10:
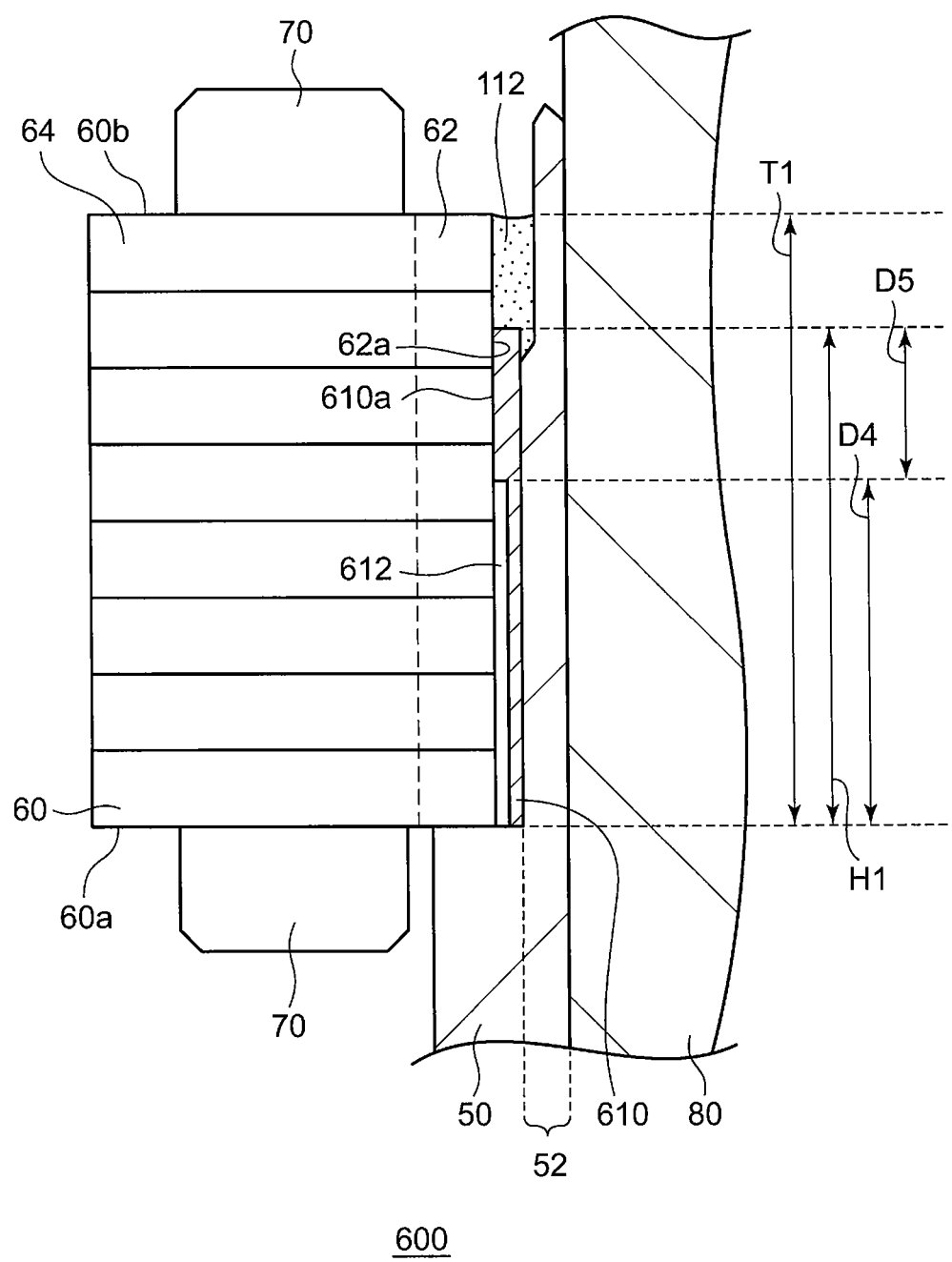
FIG. 10 is a magnified cross section, which magnifies the relevant part of the cross section of the disk drive device that includes the vibration-deadening ring according to the second modification.

FIG. 10 is a magnified cross section, which magnifies the relevant part of the cross section of the disk drive device 600 that includes the vibration-deadening ring 610 according to the second modification. FIG. 10 corresponds to FIG. 3 of the first embodiment. To ease understanding, the swaged portion 66 is omitted in FIG. 10. The vibration-deadening ring 610 is made so that a receding portion 612, the radius of which being reduced, of the width D4 is formed on the outer surface of the vibration-deadening ring 110 according to the first embodiment. In the case where the vibration-deadening ring 610 is press-fitted into the ring portion 62, a portion, of the width D4, of the outer surface 610a of the vibration-deadening ring 610 does not contribute to the press-fit, the portion corresponding to the receding portion 612.

In the disk drive device 600 according to the present modification, the outer surface 610a of the vibration-deadening ring 610 is pressed against the inner surface 62a of the ring portion 62 at least at the position closer, in the direction along the rotational axis R of the motor, to the upper surface 60b of the laminated core 60 than to the lower surface 60a of the laminated core 60, as described in relation to the disk drive device according to the first embodiment. Therefore, the core vibration can be reduced as described in relation to the first embodiment. In addition, the portion corresponding to the receding portion 612 does not contribute to the press-fit, unlike the first embodiment. This can reduce the press-fit resistance.

One opinion is that it would be better to make the receding portion 612 longer in the direction along the rotational axis R of the motor if the work efficiency is the only matter. The shorter the press-fit length is, the lower the pressure necessary for the press-fit would be. However, if the width D5, in the direction along the rotational axis R of the motor, of a portion where the vibration-deadening ring 610 is press-fitted to the laminated core 60 is too small, the force for fixing the laminated core 60 may become too weak. According to experiments performed by the inventors, it was confirmed that it was preferable to make D5/T1 greater than or equal to ⅓, in light of suppressing the core vibration.

In the disk drive devices according to the first embodiment, its modifications, and the second embodiment, the ratio of the length, in the direction along the rotational axis R of the motor, between both end portions of the connecting portion that mechanically fixes the laminated core 60 to the thickness T1 of the laminated core 60 may be arranged to be greater than or equal to ½.

The first and the second embodiments describe the case where the lower surface 60a of the laminated core 60 hits the seat of the base plate. However, the present invention is not limited to this. For example, the laminated core 60 may not hit the seat. In this case, the core vibration can be suppressed by pressure due to the press-fit of the vibration-deadening ring.

In the first and the second embodiments, after the laminated core 60 is mounted to the base plate 50, those components may be cleaned up. In this case, chips generated by the press-fit can be removed.

Figure 11:
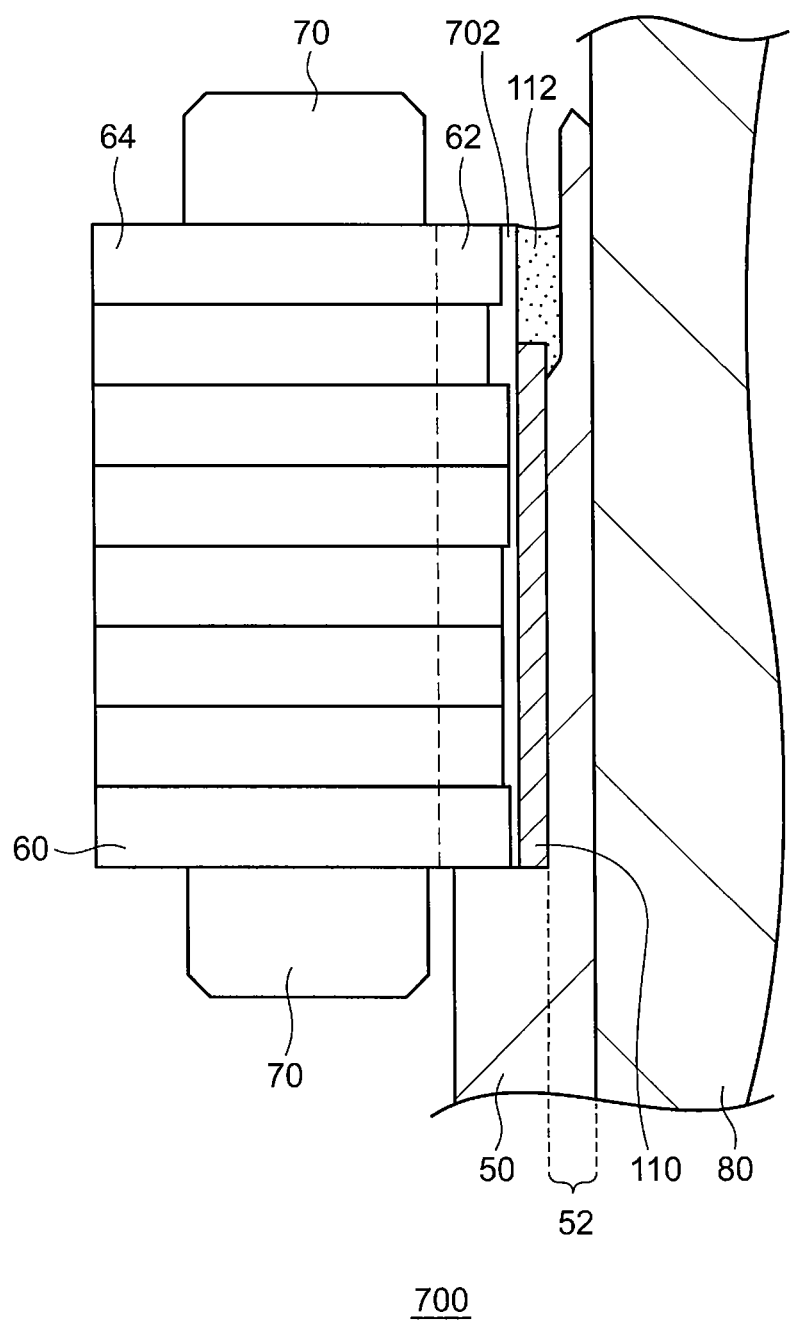
FIG. 11 is a magnified cross section, which magnifies the relevant part of the cross section of the disk drive device according to the third modification.

The first embodiment describes the case where the vibration-deadening ring 110 is made of material softer than the magnetic steel sheets of the laminated core 60, thereby reducing the press-fit resistance due to the concavo-convex inner surface 62a of the ring portion 62. However, the present invention is not limited to this. For example, a lubrication layer 702 may be formed on the inner surface 62a of the ring portion 62 of the laminated core 60 in order to relax the concavo-convexity and to improve lubrication. FIG. 11 is a magnified cross section, which magnifies the relevant part of the cross section of the disk drive device 700 according to the third modification. FIG. 11 corresponds to FIG. 3 of the first embodiment. To ease understanding, the swaged portion 66 is omitted in FIG. 11. The lubrication layer 702 is formed on the inner surface of the ring portion 62 so that the layer covers the concavo-convex inner surface.

The lubrication layer 702 is formed by, for example, a method in which an epoxy resin is sprayed or a method using the cation electrodeposition coating. In this case, a uniform thickness of film can be obtained.

In the case where the lubrication layer 702 is thin, the effect of the variation of the thickness of the lubrication layer 702 becomes relatively large. As a result, some portion where sufficient lubrication is not obtained may occur. According to experiments, it was confirmed that it was possible to perform press-fitting with desired precision in the case where the thickness of the lubrication layer 702 was greater than or equal to 20 μm. In other words, it was confirmed that the desired effect was obtained in the case where the thickness of the lubrication layer 702 was greater than or equal to half of the press-fit allowance. If the lubrication layer 702 is thick, the lubrication layer 702 may be shaved when press-fitting. If the lubrication layer 702 is shaved unevenly, the precision of press-fit may be deteriorated. According to experiments, no deterioration in the precision of the press-fit was observed in the case where the thickness of the lubrication layer 702 was less than or equal to 80 μm. In other words, it was confirmed that the desired precision of the press-fit was obtained in the case where the thickness of the lubrication layer 702 was less than or equal to the maximum value of the press-fit allowance.

The lubrication layer 702 may be formed at the same time as the surface preparation of the laminated core 60. This is preferable since less work is required to form the lubrication layer 702. Alternatively, the lubrication layer 702 may be formed separately. In this case, it is easier to obtain the desired lubrication.

The first and the second embodiments describe a so-called outer-rotor type of the disk drive device in which the magnet is located outside the laminated core. However, the present invention is not limited to this. For example, the present invention may be applied to a so-called inner-rotor type of the disk drive device in which the magnet is located inside the laminated core.

The first and the second embodiments describe the case where the sleeve is fixed to the base plate, and the shaft rotates with respect to the sleeve. However, the present invention is not limited to this. For example, the present invention may be applied to a shaft-fixed type of the disk drive device in which the shaft is fixed to the base plate, and the sleeve and the hub rotate together with respect to the shaft.

The first and the second embodiments describe the case where those embodiments are used mainly for the hard disk drive. However, the present invention is not limited to this. For example, one may manufacture a brushless motor having a structure shown in FIG. 2 and install the brushless motor into an optical disc writing/recording device such as a CD (Compact Disc) device or a DVD (Digital Versatile Disc) device.

While the preferred embodiments of the present invention have been described using specific terms, such description is for illustrative purposes only, and it is to be understood that changes and variations may be made without departing from the spirit or scope of the appended claims.

In the first embodiment, if the difference in the linear expansion coefficient between the vibration-deadening ring 110 and the base plate 50 is large, the vibration-deadening ring 110 may be deformed while the operating temperature changes between high and low repeatedly. This may reduce the effect of suppressing the vibration of the laminated core 60. To cope with this, the vibration-deadening ring 110 may be made of a material, the liner expansion coefficient of which being substantially equal to that of the base plate 50. The vibration-deadening ring 110 may be made of several known kinds of material. For example, the vibration-deadening ring 110 may be produced by die-casting an alloy of aluminum. This would reduce the weight of the disk drive device 100. For example, the vibration-deadening ring 110 and the base plate 50 are formed as a single unit. This is advantageous in that it is not necessary to attach the vibration-deadening ring 110 to the base plate 50.

What is claimed is:
1. A disk drive device, comprising:
a hub on which a recording disk is to be mounted;
a base rotatably supporting the hub through a bearing unit, the base having, on a hub-side surface, a projecting portion that has a cylindrical side surface, the center of which being along the rotational axis of the hub;
a laminated core formed by laminating steel plates, the laminated core having a ring portion and a plurality of teeth that extend radially from the ring portion;
a tubular vibration-deadening ring, one side surface of which being press-fitted into the ring portion, and another side surface of which being fixed to the cylindrical side surface of the projecting portion;
coils wound around the plurality of teeth; and
a magnet fixed to the hub, the magnet being magnetized for driving with a plurality of poles along the circumferential direction and arranged to radially face the plurality of teeth,
wherein the one side surface of the vibration-deadening ring is pressed against the ring portion, in a direction along the rotational axis of the hub, at least at a position closer to a surface of the laminated core facing the hub than to a surface of the laminated core facing the base, and wherein the laminated core is formed so that a width, in the radial direction, of the ring portion is smaller than a width, in the circumferential direction, of a portion of the plurality of teeth, the coil being wound around the portion.

2. The disk drive device according to claim 1, wherein the one side surface of the vibration-deadening ring is press-fitted into the ring portion, in the direction along the rotational axis of the hub, over a length that is longer than half of a thickness of the laminated core.

3. The disk drive device according to claim 1, wherein the length of the vibration-deadening ring, in the direction along the rotational axis of the hub, is shorter than a thickness of the laminated core, and wherein glue exists within a region between the ring portion and the cylindrical side surface of the projecting portion where the vibration-deadening ring is not present.

4. The disk drive device according to claim 1, wherein the difference between a radius of the one side surface of the vibration-deadening ring before being press-fitted into the ring portion and a radius of a surface of the ring portion into which the vibration-deadening ring is to be press-fitted before the vibration-deadening ring is press-fitted into the ring portion is arranged to be at a range of 40 μm to 80 μm.

5. The disk drive device according to claim 1, wherein the vibration-deadening ring is made of a material that is softer than the steel plates that form the laminated core.

6. The disk drive device according to claim 1, wherein at least one of the plurality of teeth includes a swaged portion that fastens the steel plates of the laminated core together.

7. The disk drive device according to claim 6, wherein the swaged portion is formed, in the radial direction, at the position closer to an end portion of the plurality of teeth than to a surface of the ring portion into which the vibration-deadening ring was press-fitted, the surface of the ring portion being pressed against the one side surface of the vibration-deadening ring.

8. The disk drive device according to claim 1, wherein the laminated core is formed so that the width, in the radial direction, of the ring portion substantially is half of the width, in the circumferential direction, of the portion of the plurality of teeth, the coil being wound around the portion.

9. The disk drive device according to claim 1, wherein the laminated core is formed by laminating more than six magnetic steel sheets.

10. The disk drive device according to claim 1, wherein a press-fit section between the one side surface of the vibration-deadening ring and the ring portion has a space between the one side surface of the vibration-deadening ring and the ring portion, the space being in between two other sections where the one side surface of the vibration-deadening ring touches the ring portion.

11. The disk drive device according to claim 1, wherein the one side surface of the vibration-deadening ring is press-fitted into the ring portion, in the direction along the rotational axis of the hub, at a length longer than one-third of a thickness of the laminated core and smaller than 90 percent of the thickness of the laminated core.

12. The disk drive device according to claim 1, wherein the vibration-deadening ring and the base are formed as a single unit.

13. The disk drive device according to claim 1, wherein the magnet is magnetized for driving with P poles, where P is an even number, and wherein, in the case where the disk drive device is rotated with a rotational frequency N (Hz) by supplying a three-phase driving current to the disk drive device, a spectral component corresponding to 9PN (Hz) of the vibration of the laminated core is smaller than a spectral component corresponding to 18PN (Hz).

14. The disk drive device according to claim 1, wherein the bearing unit is configured to include a shaft and a sleeve, which accommodates the shaft, and wherein the sleeve is fixed to an inner surface of the projecting portion of the base.

15. The disk drive device according to claim 1, wherein an annular concave portion is formed on the one side surface of the vibration-deadening ring.

16. The disk drive device according to claim 1, wherein a lubrication layer is formed on an inner surface of the ring portion of the laminated core.

17. A disk drive device, comprising:

a hub on which a recording disk is to be mounted;

a base rotatably supporting the hub through a bearing unit, the base having, on a hub-side surface, a projecting portion that has a cylindrical side surface, the center of which being along the rotational axis of the hub;

a laminated core formed by laminating steel plates, the laminated core having a ring portion and a plurality of teeth that extend radially from the ring portion;

a tubular vibration-deadening ring, one side surface of which being press-fitted into the ring portion and another side surface of which being fixed to the cylindrical side surface of the projecting portion;

coils wound around the plurality of teeth; and a magnet fixed to the hub, the magnet being magnetized for driving with a plurality of poles along the circumferential direction and arranged to radially face the plurality of teeth, wherein the one side surface of the vibration-deadening ring is pressed against the ring portion, in a direction along the rotational axis of the hub, at least at a position closer to a surface of the laminated core facing the hub than to a surface of the laminated core facing the base, and wherein a press-fit section between the one side surface of the vibration-deadening ring and the ring portion has a space between the one side surface of the vibration-deadening ring and the ring portion, the space being in between two other sections where the one side surface of the vibration-deadening ring touches the ring portion.

18. A disk drive device, comprising:

a hub on which a recording disk is to be mounted;

a base rotatably supporting the hub through a bearing unit, the base having, on a hub-side surface, a projecting portion that has a cylindrical side surface, the center of which being along the rotational axis of the hub;

a laminated core formed by laminating steel plates, the laminated core having a ring portion and a plurality of teeth that extend radially from the ring portion;

a tubular vibration-deadening ring, one side surface of which being press-fitted into the ring portion and another side surface of which being fixed to the cylindrical side surface of the projecting portion;

coils wound around the plurality of teeth; and a magnet fixed to the hub, the magnet being magnetized for driving with a plurality of poles along the circumferential direction and arranged to radially face the plurality of teeth, wherein the one side surface of the vibration-deadening ring is pressed against the ring portion, in a direction along the rotational axis of the hub, at least at a position closer to a surface of the laminated core facing the hub than to a surface of the laminated core facing the base, and wherein the one side surface of the vibration-deadening ring is press-fitted into the ring portion, in the direction along the rotational axis of the hub, at a length longer than one-third of a thickness of the laminated core and smaller than 90 percent of the thickness of the laminated core.

* * * * *